(12) United States Patent
Banger et al.

(10) Patent No.: US 8,516,119 B2
(45) Date of Patent: *Aug. 20, 2013

(54) SYSTEMS AND METHODS FOR DETERMINING ATTRIBUTES OF MEDIA ITEMS ACCESSED VIA A PERSONAL MEDIA BROADCASTER

(75) Inventors: Shashidhar Banger, Bangalore (IN); Satish Iyer, Bangalore (IN); Ruben Thomas Jacob, Bangalore (IN); Padmanabha Rao, Palo Alto, CA (US); Thiygarajan Venkatesan, Salem (IN); Amey Mangesh Shirali, Goa (IN)

(73) Assignee: Sling Media, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/295,873

(22) Filed: Nov. 14, 2011

(65) Prior Publication Data

US 2012/0059914 A1 Mar. 8, 2012

Related U.S. Application Data

(63) Continuation of application No. 12/334,959, filed on Dec. 15, 2008, now Pat. No. 8,060,609.

(60) Provisional application No. 61/019,232, filed on Jan. 4, 2008.

(51) Int. Cl.
*G06F 15/173* (2006.01)

(52) U.S. Cl.
USPC ........... 709/225; 709/219; 709/223; 725/105; 725/135

(58) Field of Classification Search
USPC .................... 709/225; 715/243; 725/135
See application file for complete search history.

(56) References Cited

U.S. PATENT DOCUMENTS

| | | | |
|---|---|---|---|
| 6,295,092 B1 | 9/2001 | Hullinger et al. | |
| 6,642,939 B1 * | 11/2003 | Vallone et al. | 715/721 |
| 6,868,447 B1 | 3/2005 | Slaughter et al. | |
| 7,113,972 B2 | 9/2006 | Yoshi et al. | |
| 7,225,142 B1 | 5/2007 | Apte et al. | |
| 7,313,809 B1 | 12/2007 | Mohan et al. | |
| 7,707,614 B2 * | 4/2010 | Krikorian et al. | 725/94 |
| 7,749,756 B2 | 7/2010 | Leonhartsberger et al. | |
| 7,769,756 B2 * | 8/2010 | Krikorian et al. | 707/736 |
| 7,877,776 B2 * | 1/2011 | Krikorian et al. | 725/95 |
| 2003/0170003 A1 | 9/2003 | Levesque et al. | |
| 2003/0229528 A1 | 12/2003 | Nitao et al. | |
| 2004/0158856 A1 | 8/2004 | Grooters et al. | |

(Continued)

OTHER PUBLICATIONS

USPTO "Non-Final Office Action" mailed Sep. 20, 2010; U.S. Appl. No. 12/334,959, filed Dec. 15, 2008.

(Continued)

*Primary Examiner* — Wing F Chan
*Assistant Examiner* — Razu Miah
(74) *Attorney, Agent, or Firm* — Ingrassia Fisher & Lorenz, P.C.

(57) ABSTRACT

Systems, devices and methods are described for determining attributes identifying media items from other media items. A first video sequence of a first media item is received from a media source, the video sequence including one or more images having first banner information embedded therein. The attributes of the first media item are determined. The determined attributes of the first media item can then be stored or otherwise processed as desired.

18 Claims, 14 Drawing Sheets

(56) References Cited

U.S. PATENT DOCUMENTS

| | | | |
|---|---|---|---|
| 2004/0255249 A1* | 12/2004 | Chang et al. | 715/723 |
| 2005/0071219 A1 | 3/2005 | Kahlert et al. | |
| 2005/0204046 A1 | 9/2005 | Watanabe | |
| 2006/0015903 A1* | 1/2006 | MacBeth et al. | 725/46 |
| 2006/0059260 A1* | 3/2006 | Kelly et al. | 709/225 |
| 2006/0075457 A1 | 4/2006 | Kim | |
| 2006/0095401 A1 | 5/2006 | Krikorian et al. | |
| 2007/0078712 A1 | 4/2007 | Ott, IV et al. | |
| 2007/0104367 A1* | 5/2007 | Nankai et al. | 382/176 |
| 2007/0168543 A1 | 7/2007 | Krikorian et al. | |
| 2008/0098300 A1 | 4/2008 | Corrales et al. | |
| 2008/0276289 A1* | 11/2008 | Stephanus van Ottele | 725/87 |
| 2009/0106393 A1* | 4/2009 | Parr et al. | 709/218 |
| 2009/0300673 A1* | 12/2009 | Bachet et al. | 725/31 |
| 2010/0040345 A1 | 2/2010 | Beach et al. | |
| 2011/0294483 A1* | 12/2011 | Sathish | 455/418 |

OTHER PUBLICATIONS

USPTO "Final Office Action" mailed Mar. 31, 2011; U.S. Appl. No. 12/334,959, filed Dec. 15, 2008.

USPTO "Notice of Allowance" mailed Sep. 20, 2011; U.S. Appl. No. 12/334,959, filed Dec. 15, 2008.

USPTO "Notice of Allowance" mailed Aug. 3, 2012 for U.S. Appl. No. 12/606,734, filed Oct. 27, 2009.

* cited by examiner

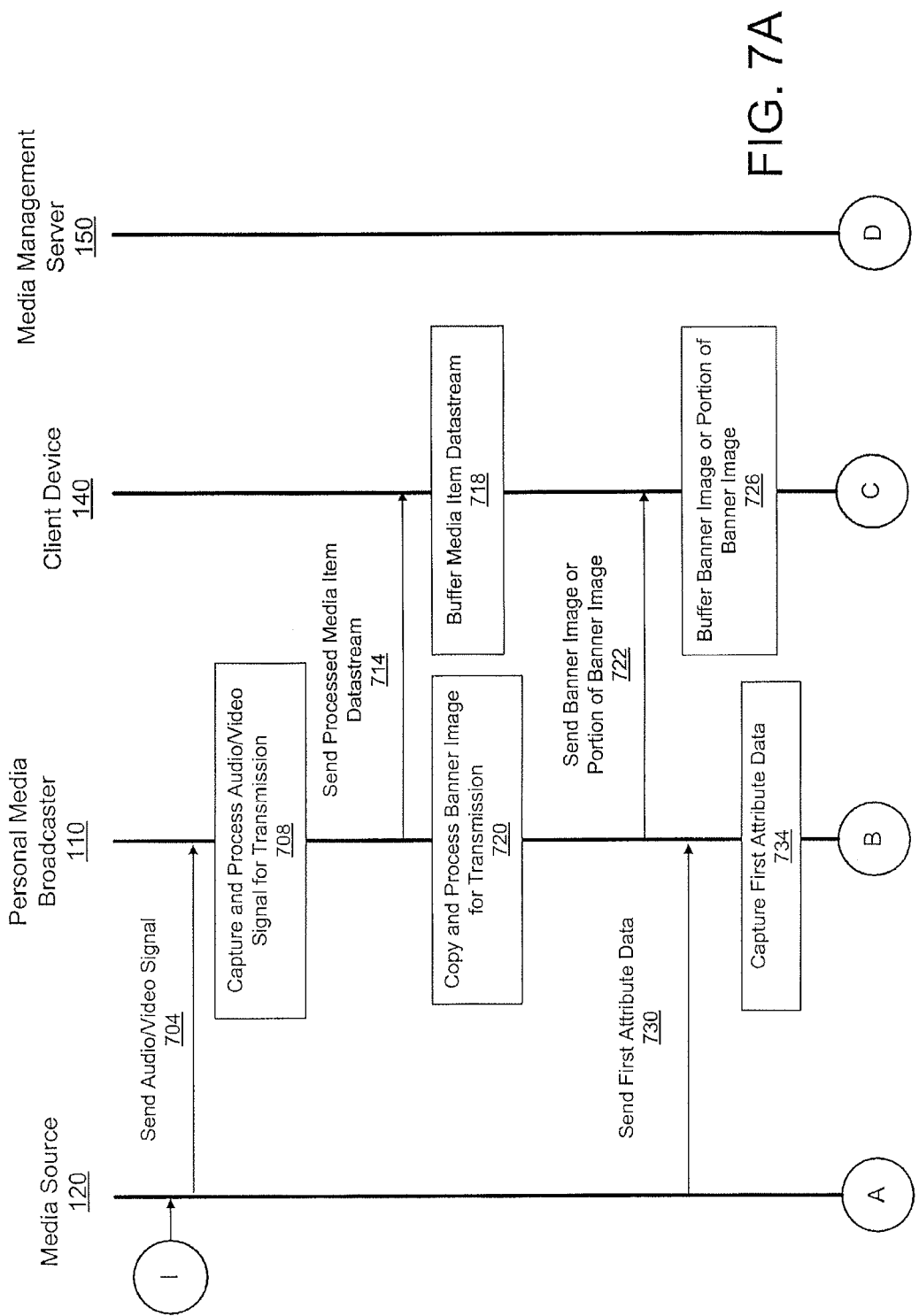

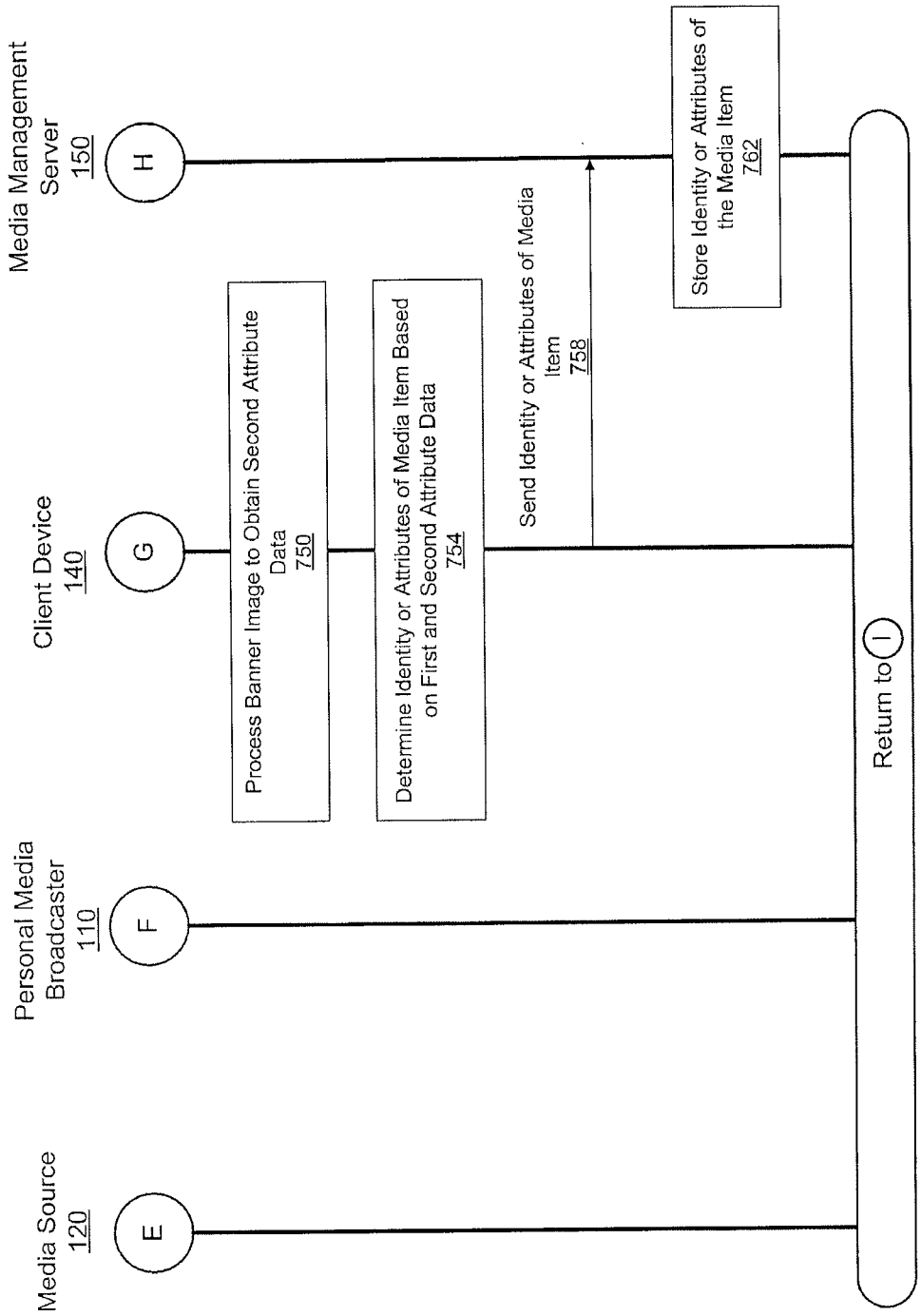

SYSTEMS AND METHODS FOR DETERMINING ATTRIBUTES OF MEDIA ITEMS ACCESSED VIA A PERSONAL MEDIA BROADCASTER

PRIORITY CLAIM

This application is a continuation of U.S. patent application Ser. No. 12/334,959, entitled "Systems and Methods for Determining Attributes of Media Items Accessed Via a Personal Media Broadcaster", filed Dec. 15, 2008, which claims the benefit of the U.S. Provisional Application No. 61/019,232, entitled "Determining Attributes of Media Items Accessed Via Personal Media Broadcaster", filed on Jan. 4, 2008. Each of these applications is hereby incorporated herein by reference in its entirety.

TECHNOLOGY FIELD

The following disclosure generally relates to determining attributes of media items.

BACKGROUND

A personal media broadcaster (e.g., a SLINGBOX product created by Sling Media of Foster City, Calif.) is any device or other system that allows a user to access media items from various media sources at remote locations. The media sources are typically coupled to the personal media broadcaster to feed audio/video ("AV") signals of the media item from the media source to the personal media broadcaster. The personal media broadcaster converts the A/V signal into a datastream suitable for transmission over a network. The user can receive the datastream at remote locations and access the media item using a client device including software or hardware components that operate in conjunction with the personal media broadcaster.

While accessing the media item on the client device, a user may want to store the media items for later viewing on the client device or for sharing the media item with other people. If the user wants to share the media item, the user may clip and send the media item to a server via a network. After the clipped media item is uploaded to the server, other people may log onto the server via the network and access the media item. Various systems may be developed to take advantage of the clipped media items stored on the server. One example of such a system would involve sending advertisements together with the media file from the server. The advertisements may then become a source of revenue for the service operator.

In some cases it may be advantageous to store attributes or the identity of the media item together with the media item itself on the client device or the server. The attributes of the media item may include, among other information, the name of the network broadcasting the media item, the time the media item was broadcasted, the title of the media item, the genre of the media item, episode number, content advisory and rating information, program synopsis, copy control advisory, the identity of the key players in the program, and/or other information as appropriate. These attributes may be used to uniquely identify the media item. By storing the identity or attributes of the media item, various value-added services (e.g., more convenient and efficient search and retrieval of the media items) may be implemented on the server. Further, by storing the identity or attributes of the media item, unauthorized distribution of a copyrighted or other protected media item may be blocked. In order to prevent unwanted distribution of the media item, however, the identity or attributes of the media item must typically be first determined to check if the media item is protected.

Users, however, may find it inconvenient and time-consuming to manually indicate the identity or attributes of the media item after selecting, editing or clipping the media item for storing or sharing. Even if the server requests entry of the identity or the attributes of the media item for storage or sharing, the users may simply omit the identity or attributes of the media item or enter false identity or attributes of the media item. Such incorrect or false identity or attributes may become an issue in providing the value-added servers or blocking distribution of the copyrighted media items.

It is therefore desirable to create systems and techniques for automatically determining attributes of media items accessed via a personal media broadcaster or the like. Various desirable features and characteristics will become apparent from the subsequent detailed description and the appended claims, taken in conjunction with the accompanying drawings and this background section.

SUMMARY

According to various exemplary embodiments, systems, devices and methods are described for determining attributes identifying media items from other media items. A first video sequence of a first media item is received from a media source, the video sequence including one or more images having first banner information embedded therein. The attributes of the first media item are determined based on at least the first banner information extracted from the first video sequence. The determined attributes of the first media item can then be stored or otherwise processed as desired.

Other embodiments provide a personal media broadcaster for sending data of a media item to a client device via a network. The broadcaster device/system comprises an input interface coupled to a media source and configured to receive the data of the media item from the media source. A signal processor module is coupled to the input interface and is configured to construct a datastream suitable for transmission over the network, the datastream including images in a first resolution. An attribute extractor is coupled to the input interface and is configured to extract first attribute data of the media item, the first attribute data representing data for identifying the first media item from other media items. A network interface is coupled to the signal processor module and the attribute extractor, wherein the network interface is configured to transmit the media stream and the attribute of the media item to the client device over the network.

Still other embodiments provide a method of selecting and storing media items received from a personal media broadcaster via a network. A first video sequence of a first media item is received from the personal media broadcaster. First attribute data associated with the first media item is received from the personal media broadcaster, the first attribute data representing data for identifying the first media item from other media items. The first attribute data and at least a portion of the datastream of the first media item are buffered on a temporary basis, and attributes of the first media item are determined using the stored first attribute data responsive to receiving user input selecting the first media item.

Various other embodiments, aspects and other features are described in more detail below.

BRIEF DESCRIPTION OF THE DRAWING FIGURES

Exemplary embodiments will hereinafter be described in conjunction with the following drawing figures, wherein like numerals denote like elements, and FIG. 1 is a block diagram of an exemplary personal broadcasting system;

FIGS. 7A-7C are flowcharts of an exemplary method for determining attributes of a media item;

Figure 10A:
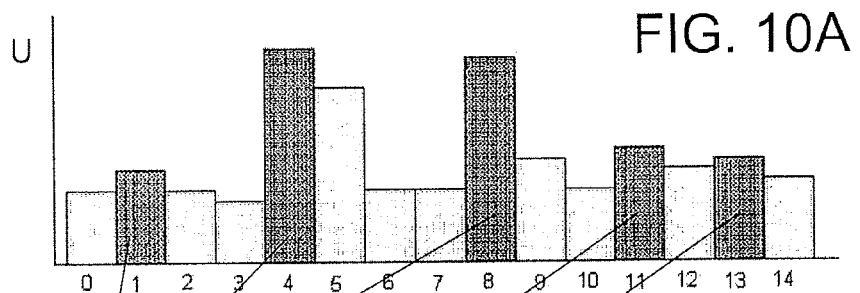
Figure 10B:
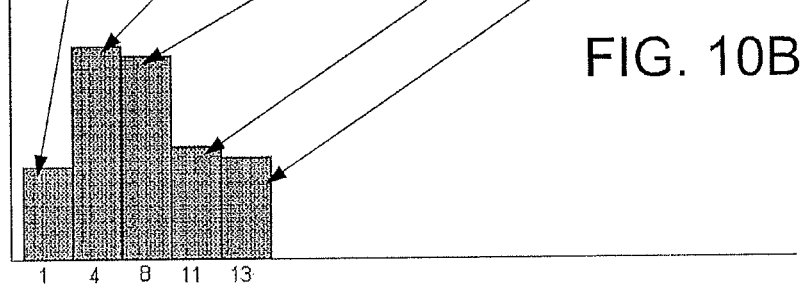
Figure 10C:
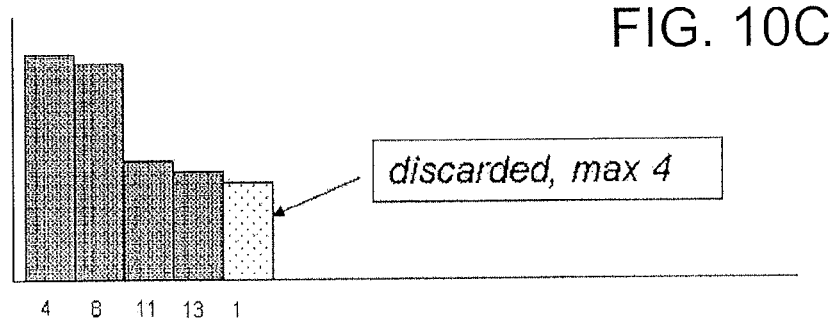
Figure 11A:
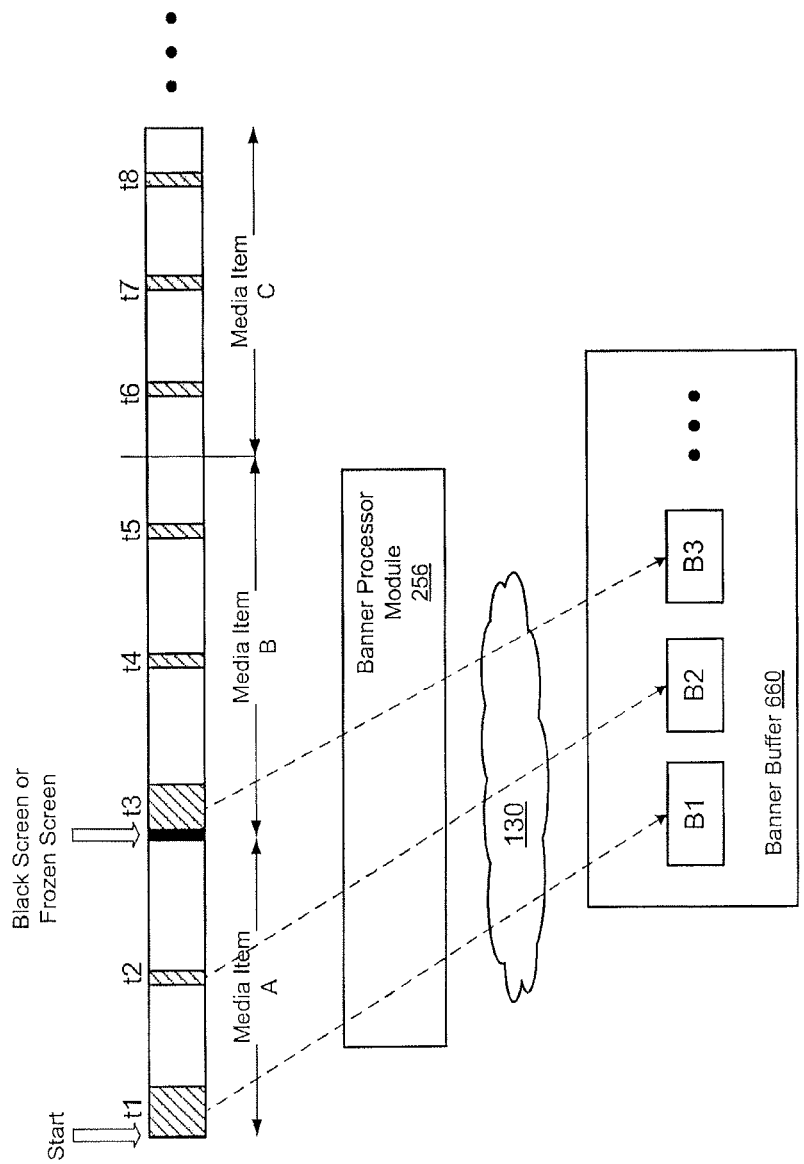
Figure 11B:
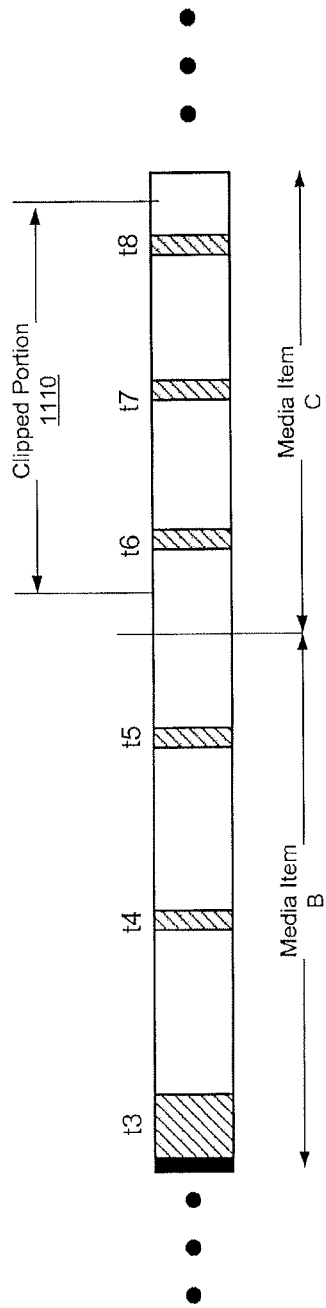
Figure 12:
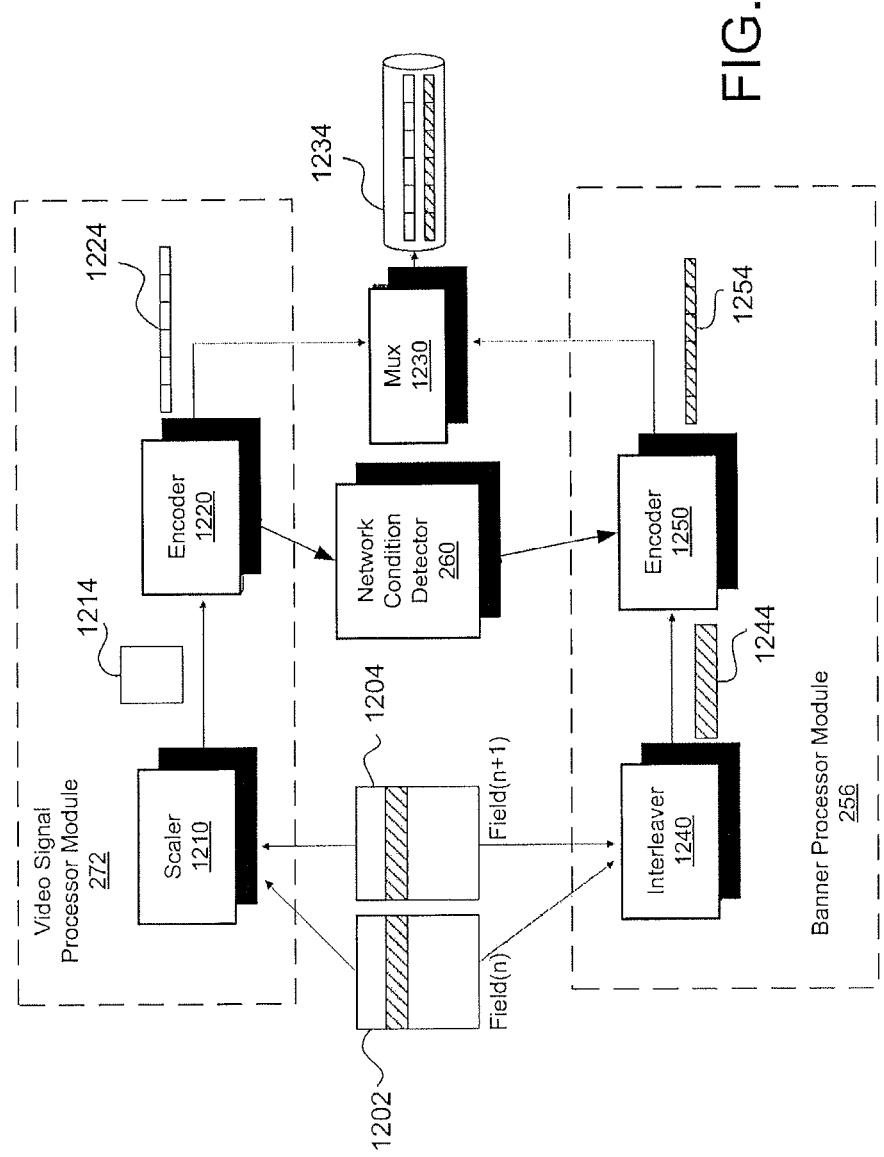

FIGS. 10A-C are diagrams illustrating an exemplary technique for detecting changes in color components of images;

FIGS. 11A-B are diagrams illustrating an exemplary technique for capturing and buffering an image banner; and FIG. 12 is a diagram illustrating an exemplary process for transmitting a banner image.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

Various embodiments allow automatic determination of the identity or attributes of the media item accessible via a personal media broadcaster. Some media sources such as a set-top box, a PVR (Personal Video Recorder) and a DVR (Digital Video Recorder) obtain the media item from a broadcast television network. Media items derived from the broadcast television network can be identified uniquely through a relatively small number of attributes. The attributes of the media items may include, but are not limited to: (i) the name or identity of the network that broadcasts the content, (ii) the scheduled date and time of broadcast on the network, (iii) the title of the media item, (iv) the genre of the media item, and/or (v) the viewing advisory rating. These attributes of broadcast television media items may be available as electronic program guide (EPG) data from a variety of sources, such as Tribune Media Services of Chicago, Ill. In one embodiment, a subset of the attributes referenced as key attributes (KA) is used to uniquely identify the media item. The KA of a media item originating from a broadcast television network could include such information as: (i) the name or identity of the network that broadcast the content, (ii) the title of the media item, (iii) the scheduled date and time the media item is broadcasted on the network, and/or the like.

The media items derived from sources other than the broadcast television network typically have different sets of attributes. For example, in the case of DVD media item, the title of the content, the entity owning the rights to the content, and the year of production may be the key attributes. For user-generated content (UGC), the attributes may be whatever the owner determines them to be, although the uniqueness of attributes in this case is not necessarily guaranteed.

Various embodiments automatically determine the identity of the media items using attributes of the media obtained from one or more sources. Various sources of data for determining the attributes ("attribute data") could include, among other sources, the banner information overlaid on the screen by the media source, electronic program guide data, closed caption data, and XDS (extended data services) data. The attribute data from such sources are processed and analyzed to determine the identity or attributes of the media item.

Architecture of Personal Broadcasting System

Figure 1:
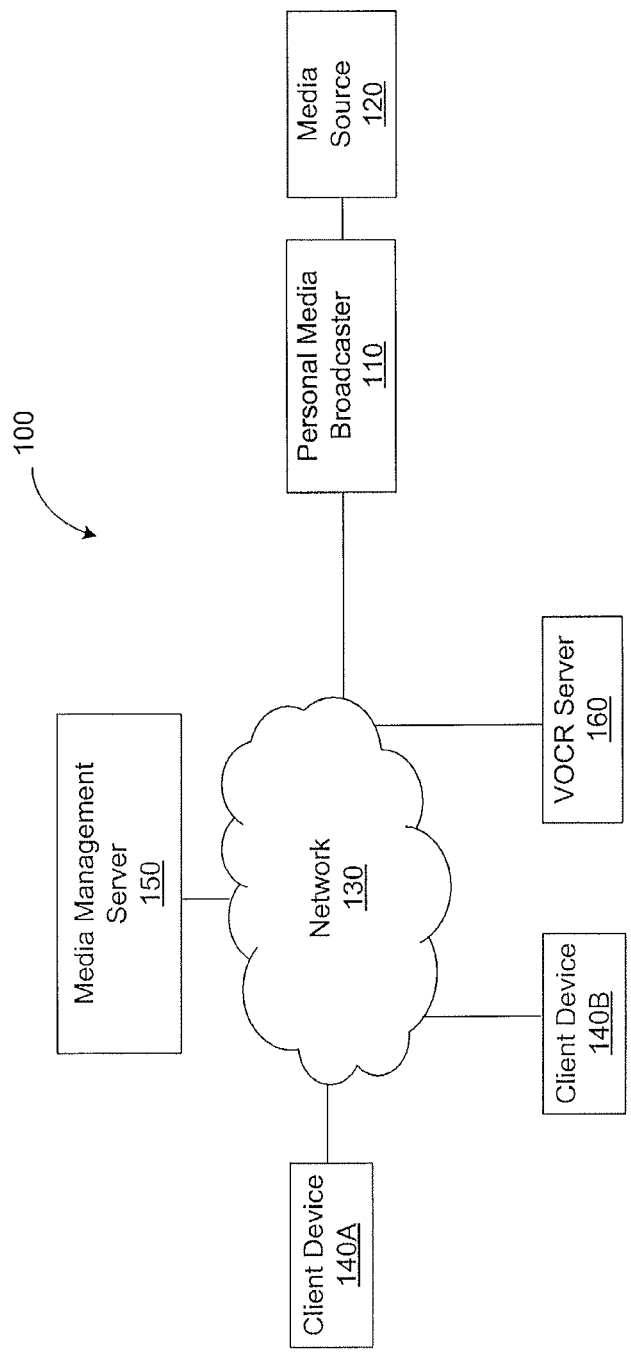

FIG. 1 illustrates the architecture of an exemplary personal broadcasting system 100 according to one embodiment. The personal broadcasting system 100 includes a network 130, a personal media broadcaster 110, a media source 120, client devices 140A, 140B, and a media management server 150. In one or more embodiments, the personal broadcasting system 100 further includes a video optical character recognition ("VOCR") server 160 dedicated to performing a relatively computation-intensive optical character recognition algorithm. The personal media broadcaster 110 is coupled to the media source 120 to receive A/V signals from the media source 120. The media source 120 can be any device capable of providing A/V signals to personal media broadcaster 110, including, among other devices, a television tuner, a cable or satellite set-top box, a DVD (digital video disk) player, a PVR (personal video recorder), a game console, a DVD jukebox, a music server, a satellite radio receiver, a camcorder, a digital video recorder (DVR) and/or the like.

The personal media broadcaster 110 is coupled between the media source 120 and the network 130 to convert the A/V signals received from the media source 120 to data suitable for transmission over the network 130. The personal media broadcaster 110 may be, for example, as described in U.S. Patent Application Publication No. 2006/0095471 entitled "Personal Media Broadcasting System" filed on Jun. 7, 2005, which is incorporated by reference herein in its entirety, although other types of broadcasters could be equivalently used in other embodiments. Additional components of the personal media broadcaster 110 are described below in detail with reference to FIG. 3.

The client devices 140A, 140B (hereinafter collectively referred to as the client device 140) can be any device that can communicate with the personal media broadcaster 110 over the network 130 to allow users to play, edit or clip the media item transmitted from the media source 120. The client device 140 may be, among other devices, a personal computer, a cellular or other mobile phone, a video game player, a set top box or other appliance coupled to a television or display, a software program, a personal digital assistant, and/or the like. The client device 140 may include client software that enables the users to access the media item sent over the network 130. The components and functions of the client device 140 are described below in detail with reference to FIGS. 2A and 2B.

In one or more embodiments, the personal broadcasting system 100 further includes the Video Optical Character Recognition (VOCR) server 160. The VOCR server 160 receives images including the banner information ("banner image"), processes the banner image to extract a text from the banner image, and sends the extracted text along with the location of the text on the banner image to other components of the personal broadcasting system 100 to determine the identity or attributes of the media item. The functionality of the VOCR server 160 may be incorporated into other components of the personal broadcasting system 100, as described below in detail with reference to FIG. 6.

The media management server 150 is any device or system that is capable of storing the media item uploaded by the users using the client device 140. The media management server 150 may also function as a central repository where multiple users can upload and download media items. The media management server 150 may be, for example, as described in U.S.

Patent Application Publication No. 2007/019532 entitled "Management of Share Media Content" filed on Jan. 7, 2007, and U.S. Patent Application Publication No. 2007/0168543 entitled "Capturing and Sharing Media Content" filed on Jan. 7, 2007, which are both incorporated by reference herein in their entirety.

The network 130 may comprise any suitable networking technology, including but not limited to wide area mobile networks (e.g., GPRS, EDGE, 1X-RTT, 1x-EvDO, and FOMA 2.5G and 3G cellular networks), WiFi and other public broadband access locations, WiMAX networks, other LANs (such as at work, school, or a friend's home), and direct connections to other Internet service providers.

Architecture of an Exemplary Personal Media Broadcaster

Figure 2:
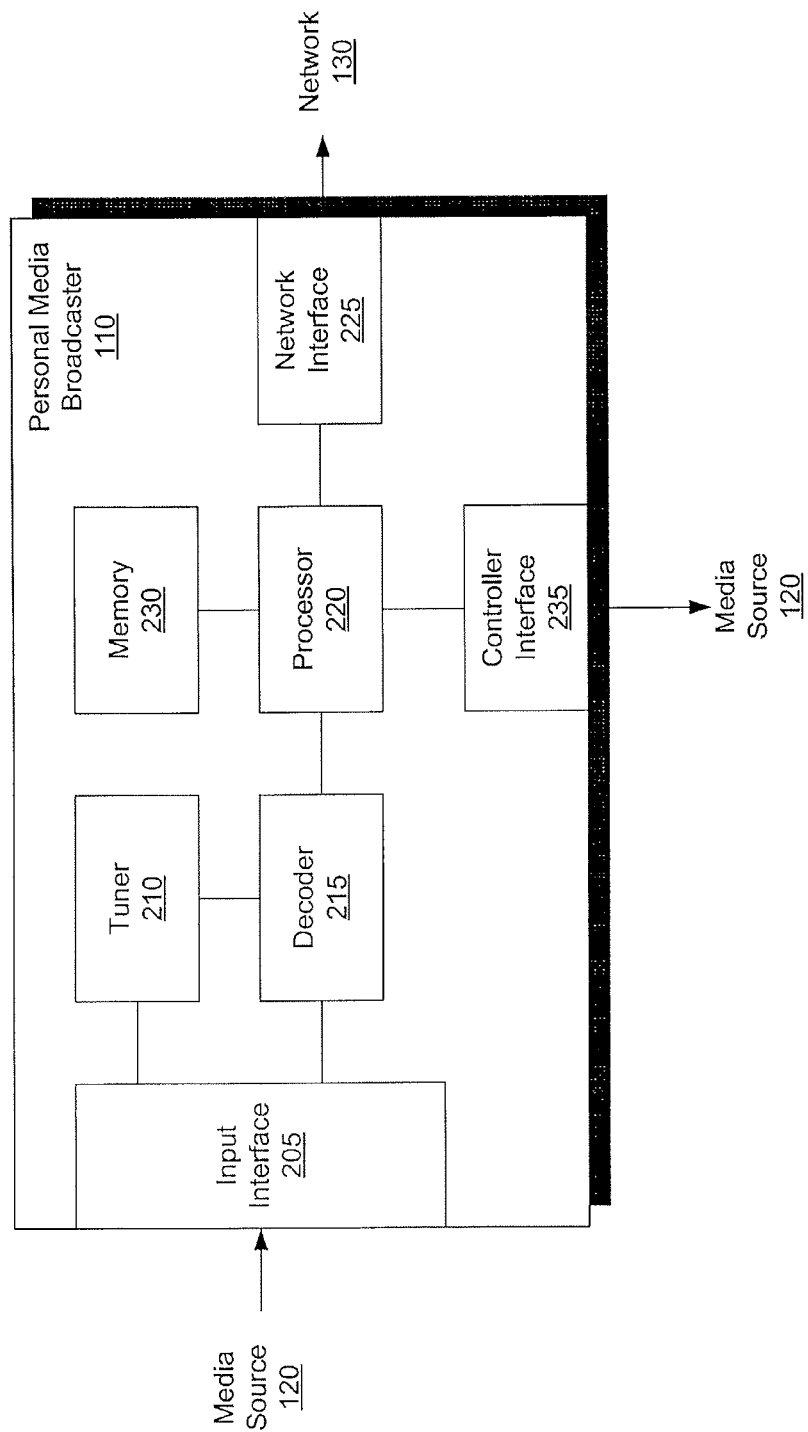
FIG. 2 is a block diagram of an exemplary personal media broadcaster.

FIG. 2 is a block diagram illustrating the personal media broadcaster 110 according to one embodiment. The broadcaster 110 suitably includes an input interface 205, a tuner 210, a decoder 215, a memory 230, a processor 220, a controller interface 235, and the network interface 225. One example of a personal media broadcaster is described in U.S. Patent Application Publication No. 2006/0095471 entitled "Personal Media Broadcasting System" filed on Jun. 7, 2005, which is incorporated by reference herein in its entirety.

Figure 3:
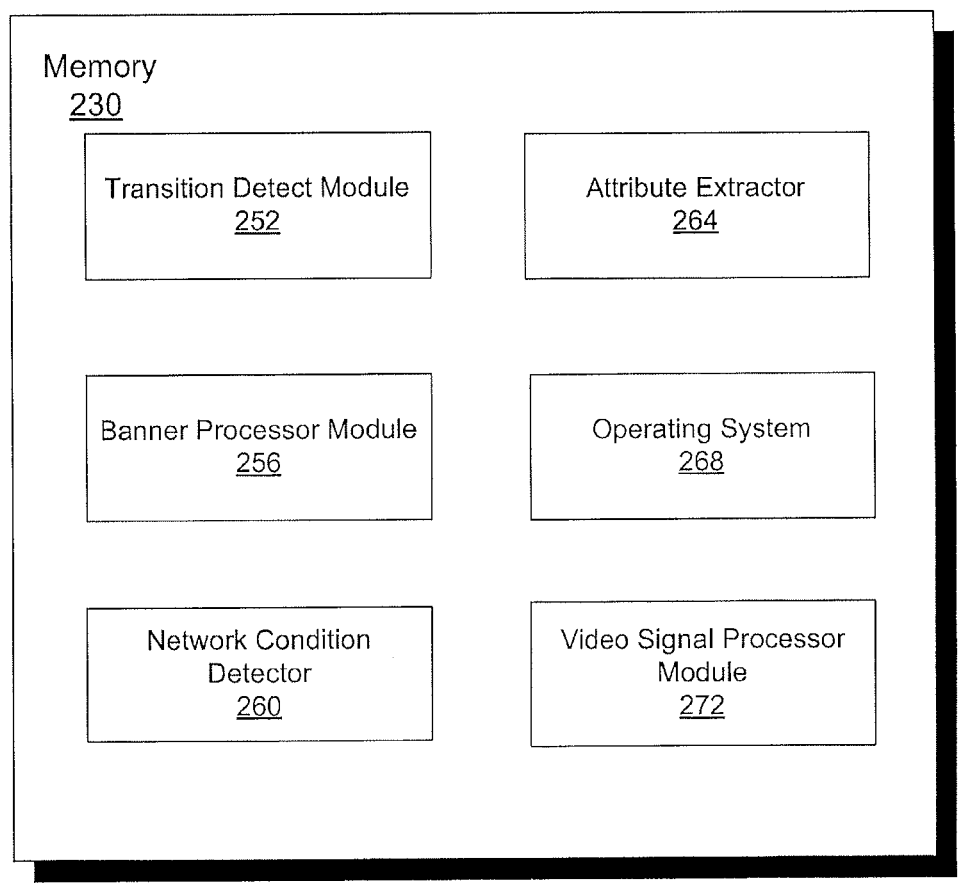
FIG. 3 is a block diagram illustrating software components of an exemplary personal media broadcaster.

FIG. 3 is a block diagram illustrating exemplary software components of an personal media broadcaster 110 that may be stored in the memory 230, according to one embodiment. The software components of this embodiment can include, among other components, a transition detect module 252, a banner processor module 256, a network condition detector 260, an attribute extractor 264, an operating system 268, and a video signal processor module 272. These software components of the broadcaster 110 may also be implemented as hardware or any combination of hardware and software. Also, two or more software components of the personal media broadcaster 110 may be combined into a single component.

The transition detect module 252 detects the transition in the media item received from the media source 120, as described below in detail with reference to FIGS. 8 and 9. The media item received from the media source 120 may change for various reasons, such as switching of the channel or termination of scheduled broadcasting time. When the transition in the media item occurs, the attribute data of the media item may be stale and no longer be valid for the new media item. Therefore, updated attribute data of the new media item is generally obtained after the transition of the media item. The transition detect module 252 detects the transition of the media item in the A/V signal from the media source 120, and informs the banner processor module 256 and the attribute extractor 264 to obtain the updated attribute data of the new media item.

Figure 4:
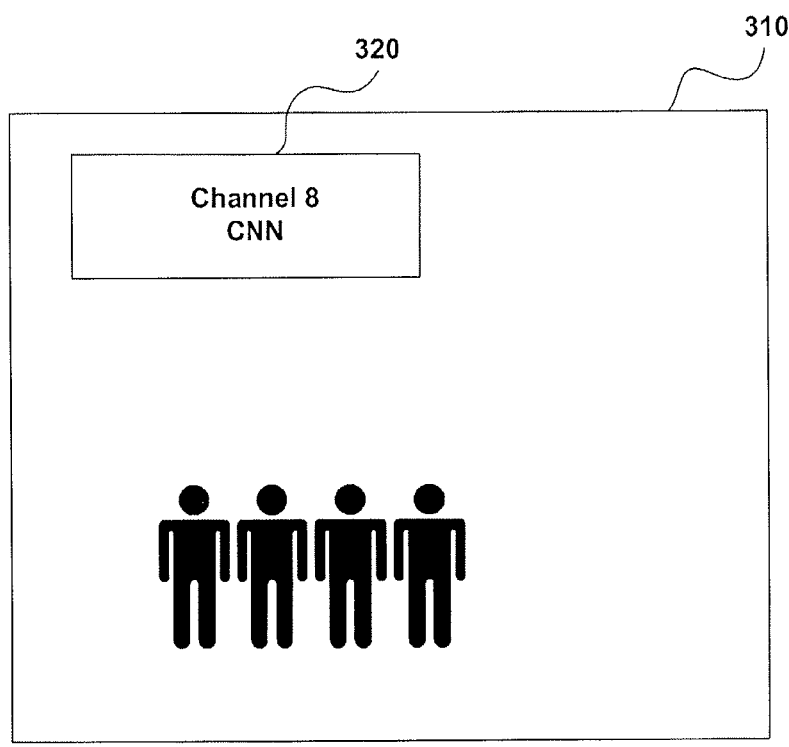
FIG. 4 is an exemplary screen display containing one type of banner.

In one embodiment, the banner processor module 256 is responsible for processing the portion of the image including the banner information ("banner image") for extracting the attribute data. The banner information is an on-screen display that may be embedded or otherwise presented by the media source 120 automatically upon certain events or in response to the user's inputs. Referring to FIG. 4, the banner information 320 of an image 310 includes information such as the channel name (e.g., CNN) or channel number (e.g., 8). In some media sources (e.g., a set-top box or a television) such banner information is generated when the user changes the channels of the media source or receives IR commands requesting generation of a menu screen. As described below with reference to FIGS. 8 and 9, the user may change the channel of the media source 120 using a remote command from the client device 140 transmitted over the network 130 to the personal media broadcaster 110. The personal media broadcaster 110 may relay the remote command to the media source 120 via the IR emitter or any other connection such as Ethernet, USB, or an RS-232 serial controller. In response, the media source 120 generates A/V signals that include the banner information 320.

The text can typically be extracted more accurately when the banner image is in higher resolution. Therefore, high resolution banner images may be provided, when practical, for accurate extraction of the text data (and hence, generation of accurate attribute data) from the banner image. Referring back to FIG. 2, in one embodiment, the banner processor module 256 tags a portion of the banner image including the banner information 320. The tagged portion of the banner image 320 is then encoded at the video signal processor module 272 in higher quality of resolution compared to other portions of the image 310. In another embodiment, the banner processor module 256 does not interrupt or otherwise modify its normal video encoding and transmission operation of the media item, but instead makes a copy of a portion of the video data containing the banner information prior to encoding of the video data, and then encodes the copy a second time in a high quality, as described below in detail with reference to FIG. 12.

In various embodiments, the banner image may not be sent to the client device 140 or to the VOCR server 160. Instead, the banner processor module 256 of the personal media broadcaster 110 processes the banner image and extracts the attributes of the media item using optical character recognition technology. By processing the banner image at the personal media broadcaster 110, the banner images need not be transmitted to the VOCR server 160 or the client device 140.

Extracting the attributes at the personal media broadcaster 110 is advantageous in some cases, because transmission of the high quality banner image over the network 130 may no longer be needed, thereby reducing the network bandwidth used by the personal broadcasting system 100. In other embodiments, however, the VOCR function may be performed at the client device 140 or at a separate VOCR server 160, which may receive the banner from either the broadcaster 110 or the client device 140. Such embodiments are described more fully below.

In one embodiment, the banner processor module 256 learns the layout of the banner information 320 within the banner image 310. Before the layout of the banner is learned, all the text on the banner image may be extracted and used for further processing at the outset. Over time, however, the banner processor module 256 can learn the layout of the banner, especially the location of the text of the key attributes. The banner processor module 256 may learn the layout of the banner information 320 based on consistent matching of the text in certain locations of the banner image and the attributes determined from other types of the attribute data. For example, the banner processor module 256 tracks the location of the banner information 320 that consistently matches the channel names in the EPG data, and then learns that the channel names are displayed at such location. Based on such learning, the banner processor module 256 selects a portion of the image that is predicted as including the banner information 320. Only the predicted portion of the image may then be subject to further processing at the banner processor module 256 or sent to the client device 140 to extract the attribute data, thereby conserving processing resources. In this way, the attribute data can be extracted efficiently and accurately without a priori knowledge about the location of the banner information 320 within the banner image 310.

In one or more embodiments, the client device 140 forces the media source 120 to generate the banner image via the personal media broadcaster 110. Alternately or additionally, the broadcaster 110 may automatically generate the banner image without additional instruction from the client device 140 in certain circumstances (e.g., near the top or bottom of the hour, or at other times when programming changes are expected). In either case, the banner image may be forced when the transition to a new media item is suspected. If the media source does not automatically provide banner information after the suspected event or if the personal media broadcaster 110 cannot reliably capture a banner image following the transition of the media item, a command may be sent from the client device 140 to the media source 120 via the personal media broadcaster 110 forcing the media source 120 to generate the banner image. For example, an 'info command' may be sent from the personal media broadcaster 110 to the media source 120 via the IR emitter to force the banner image. In one embodiment, the banner processing module 256 also performs preprocessing of the image for more accurate recognition of the text by the client device 140 or the VOCR server 160.

In one or more embodiments where the banner image is transmitted to the client device 140 or the VOCR server 160 to extract the attribute data, the network condition detector 260 operates in conjunction with the network interface 225 to determine the condition and bandwidth of the network 130. If the condition and bandwidth of the network 130 allow simultaneous transfer of the datastream of the media item from the media source 120 (as converted by the video signal processing module 272) and the banner image data, the media item datastream and the banner image data are sent over the network 130 in the same channel. In contrast, if the condition and bandwidth of the network 130 does not allow simultaneous transfer of the media item datastream and the banner image data over the network 130, the media item data is given priority over the banner image data. That is, the banner image data is sent over the network 130 in a separate channel using the bandwidth of the network 130 available after transmitting the media item data.

The attribute extractor 264 suitably extracts the attribute data from the A/V signals received from the media source 120. The attribute data refers to data that can be used to identify the identity or any other attributes of the media item. In one embodiment, the attribute extractor 264 extracts electronic program guide data, closed caption data, and XDS (extended Data Services) data from the A/V signals from the media source 120. The attribute data extracted by the attribute extractor 264 is sent to the client device 140 over the network 130 to determine the attributes of the media item.

The operating system 268 manages resources of the personal media broadcaster 110. The operating system 268 provides a platform on which other software components of the personal media broadcaster 110 may operate.

The video signal processor module 272 converts the A/V signals received from the media source 120 into a datastream suitable for transmission over the network 130. The conversion includes scaling of the images, encoding of the video sequence, and compressing of the video sequence.

Architecture of an Exemplary Client Device

Figure 5:
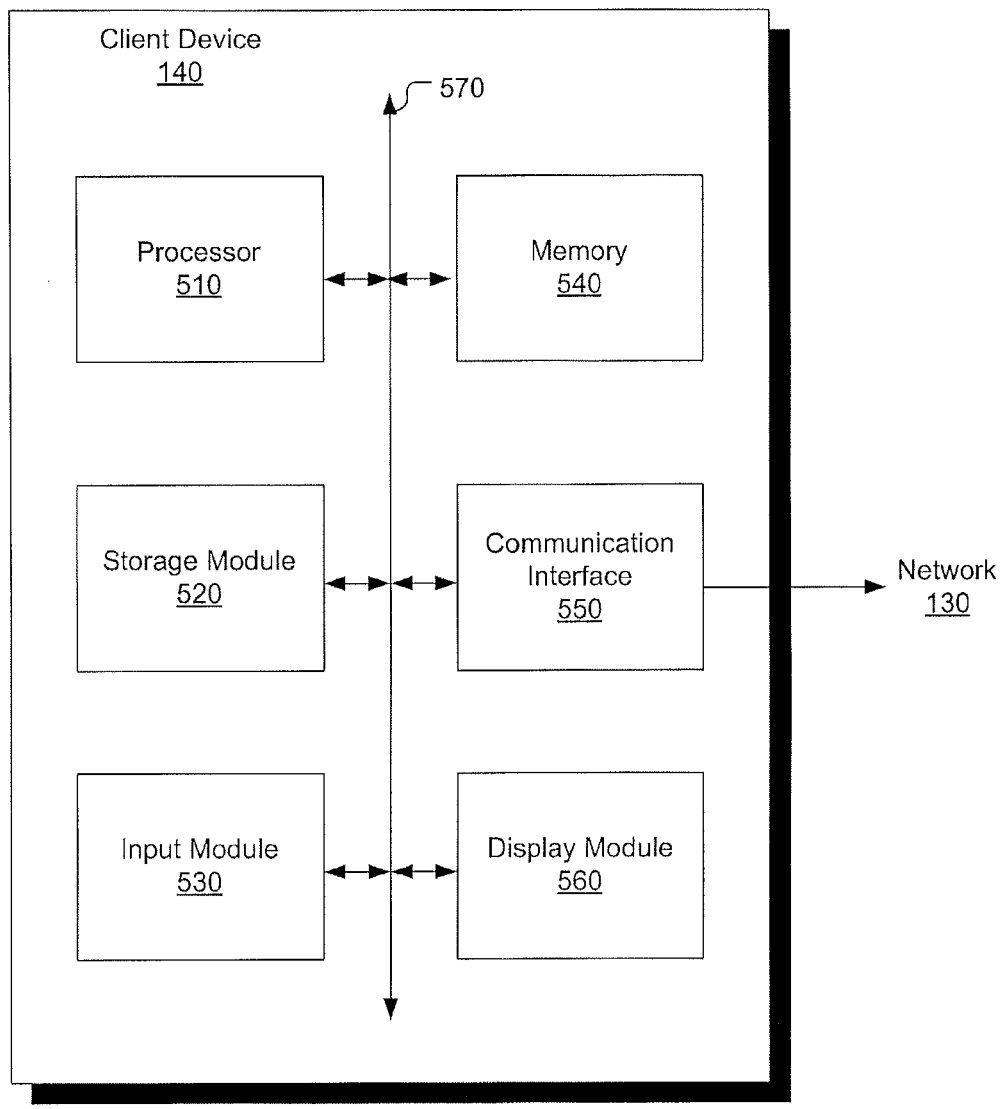
FIG. 5 is a block diagram of an exemplary client device.

FIG. 5 is a block diagram of an exemplary client device 140 according to one embodiment. The client device 140 includes, among other components, a processor 510, a memory 540, a storage module 520, a communication interface 550, an input module 530, and a display module 560. Not all components of the electronic device 104 are shown in FIG. 5, and certain components not necessary for illustration are omitted herein. Each of the components of the client device 140 may be communicatively coupled though a bus 570.

The processor 510 is any conventional processor or controller. The memory 540 is conventional computing memory such as a random access memory (RAM). The storage module 520 is a conventional long term storage device, for example, a flash memory or a hard disk drive (e.g., magnetic hard drive). The storage module 520 typically stores software components, as described below with reference to FIG. 6. The input module 530 can be a keyboard, a touch sensitive screen, or any other type of input device, and the display module 560 can be a flat panel display such as liquid crystal display (LCD) device or any other type of display device.

The communication interface 550 may include one or more wired or wireless communication interfaces used to communicate with the personal media broadcaster 110 or the media management server 150 over the network 130. For example, the communication interface 550 may include an Ethernet (e.g., 10Base-T interface and/or a Wi-Fi interface (e.g., IEEE 802.11b/g)) for communication via the Internet.

Figure 6:
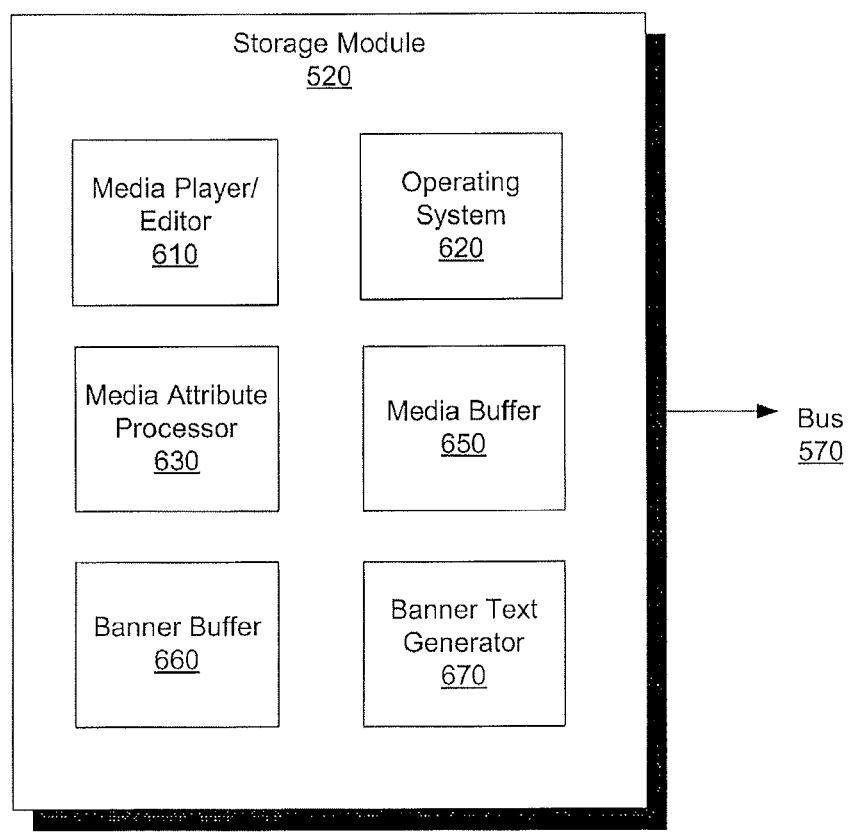
FIG. 6 is a block diagram of an exemplary storage module.

FIG. 6 illustrates the software components of the client device 140, according to one embodiment. The storage module 520 in the client device 140 includes, among other components, a media player/editor 610, an operating system 620, a media attribute processor 630, a media buffer 650, and a banner buffer 660. In one embodiment, the storage module 520 further includes a banner text generator 670. The media player/editor 610 allows the users to play, clip or edit the media item received from the personal media broadcaster 110 over the network 130. The media player/editor 610 operates in conjunction with the media buffer 650 so that the user may play, clip or edit the portion of the media item that is buffered in the media buffer 650. After selecting, clipping or editing the media item, the media player/editor 610 stores the media item in the client device 140 or uploads the media item to the media management server 150 for storing and sharing. The media item may be further processed (e.g., transcoded or edited) before uploading to the media management server 150.

In one embodiment, the media player/editor 610 receives user inputs for invoking operations at the media source 120. For example, when the user wants to change the channel of the media source, the user may change the channel of the media source currently being viewed using the user interface of the media player/editor 610 to send commands to the personal media broadcaster 110. The personal media broadcaster 110 relays the commands to the media source 120 via the IR emitter or other controllers, as described above with reference to FIG. 2.

The operating system 620 manages resources of the client device 140. Further, the operating system 620 provides a platform on which other software components of the client device 140 may operate.

In one embodiment, the media attribute processor 630 functions to determine the identity or attributes of the media item based on the attribute data from one or more sources. The attribute data includes, among other data, EPG data, closed caption data, XDS (eXtended Data Services) data, and data filtered and extracted from the banner image using the banner text generator 670, VOCR server 160 and/or any other source as appropriate. As described below in detail, the banner text generator 670 or the VOCR server 160 recognizes the text included in the banner image using, for example, optical character recognition technology or the like. Any of the various techniques described above with respect to banner processor module 256 could be equivalently deployed in banner text generator 670 in any number of alternate embodiments.

The media attribute processor 630 uses one or more types of the attribute data to determine the identity or attributes of the media item.

In one embodiment, the media attribute processor 630 determines first candidate attributes based on first attribute data (e.g., EPG data, closed caption data, or XDS data). Subsequently, the media attribute processor 630 determines second candidate attributes based on second attribute data (e.g., text extracted from the banner information). The media attribute processor 630 considers the first and second candidate attributes to produce final identity or attributes of the media item.

In one embodiment, the media attribute processor 630 generates a confidence score based on the matching of the first and second candidate attributes. The confidence score indicates likelihood that the final identity or attributes of the media item determined by the media attribute processor 630 are accurate. If the first and second candidate attributes do not match, a low confidence score may be assigned to the final attributes to indicate that the final attributes may be incorrect. In contrast, if the first and second candidate attributes match, a high confidence score may be assigned to the final identity or attributes to indicate that the final attributes are probably correct. The confidence score may then be stored on the media management server 150 or the client device 140 together with the identity or final attributes of the media item.

In one embodiment, the media attribute processor 630 includes filters to obtain information relevant to determining the attributes of the media item, as described below in detail in a section under the subtitle "Filtering of Banner Information." The media attribute processor may learn the structure of the banner information to obtain text data from only certain parts of the banner image. The filtering functionality may also be implemented in the VOCR server 160 or the banner text generator 670 instead of the media attribute processor 630.

In one embodiment, the media attribute processor 630 determines the attributes of the media item only after the user selects, clips or edits the media item. The attribute data is stored in the media buffer 650 and the banner buffer 660, and the attribute data is processed after the user selects, clips or edits the media item. By deferring the processing of the attribute data until the media item is selected, clipped or edited by the user, processing resources of the client device 140 or the VOCR system 160 need not be consumed on processing the attribute data for the media item that user does not want stored on the client device 140 or the media management server 150.

In one embodiment, the media attribute processor 630 operates in conjunction with a remote server (not shown) via the network 130 to determine the attributes of the media item. For example, the media attribute processor 630 obtains certain attributes (e.g., the channel number, name of the broadcaster, and time of the broadcast) of the media item using one or more sources of the attribute data, and then accesses a database for storing broadcasted media items (such as Tribune or other program database) to determine additional attributes of the media item (e.g., the name or episode of the program) or determine the identity of the media item. The program database may be, for example, a database managed by Tribune Media Services of Chicago, Ill. or any other party that contains information of channel line-ups for various satellite, broadcast and/or cable service providers. The media attribute processor 630 generates multiple candidate attributes of the media item, and matches the candidate attributes with data stored on Tribune database to determine the most likely identity and attributes of the media item.

The media buffer 650 temporarily stores a predetermined amount of the media item received from the personal media broadcaster 110 so that the media item may be accessed or edited in a time-shifted manner. In one embodiment, the media buffer 650 is a ring buffer that deletes older media item datastream and updates it with newly received media item datastream.

The media buffer 650 allows the user to retrieve previously received portions of the media item for playing, clipping or editing of the media item using, for example, the media player/editor 610. In one embodiment, the media buffer 650 stores the attribute data received from sources other than the banner image.

The banner buffer 660 stores the banner image selected from a video sequence of the media item. The banner buffer 660 may store a full screen image of the banner image or a portion of the banner image including the banner information. As described above with reference to FIG. 3, the banner processor module 256 of the personal media broadcaster 110 may determine the portion of the banner image including the banner information and send only this portion of the banner image in high resolution to the client device 140. The banner buffer 660 stores the banner image for retrieval by the banner text generator 670 or the media attribute processor 630. The media attribute processor 630 may retrieve and send the banner image to the VOCR server 160 for extraction of the text data. In one embodiment, the banner buffer 660 is combined with the media buffer 650.

In one embodiment, the client device 140 includes a banner text generator 670. The banner text generator 670 includes an optical character recognition engine that processes the banner image stored in the banner buffer 660. Specifically, the banner text generator 670 extracts text data included in the banner image. The extracted text data is processed by the media attribute processor 630 to determine the attributes of the media item.

Alternatively, the client device 140 does not include the banner text generator 670. Instead, the text data is extracted using the VOCR server 160 located remotely from the client device 140 and communicating with the client device 140 over the network 130. In this embodiment, the media attribute processor 630 sends the banner images to the video optical recognition server 160 via the network 130 for processing. The VOCR server 160 extracts the text data from the banner information and returns the extracted text data to the client device 140.

The processing of the banner image to extract text data is generally considered to be relatively computation intensive; and thus, the client device 140 may not necessarily have sufficient capacity or capability to extract the text data using the optical character recognition algorithm. By delegating the text data extraction to the VOCR server 160, the client device 140 may perform other operations (e.g., receiving and decoding of the datastream from the personal media broadcaster 1 10) without experiencing interruptions due to processes associated with extraction of the text data from the banner image.

In one embodiment, the process of extracting the text data may be distributed between the client device 140 and the VOCR server 160. For example, the client device 140 may "pre-process" portions of the banner image by sending only relevant portions of the banner image to the VOCR server 160 for text recognition. The recognized text may be sent from the VOCR server 160 to the client device 140 for performing "post-processing" on the recognized text such as applying rules or syntax to extract certain attributes (e.g., date or time).

Exemplary Method of Determining Attributes

Figure 7B:
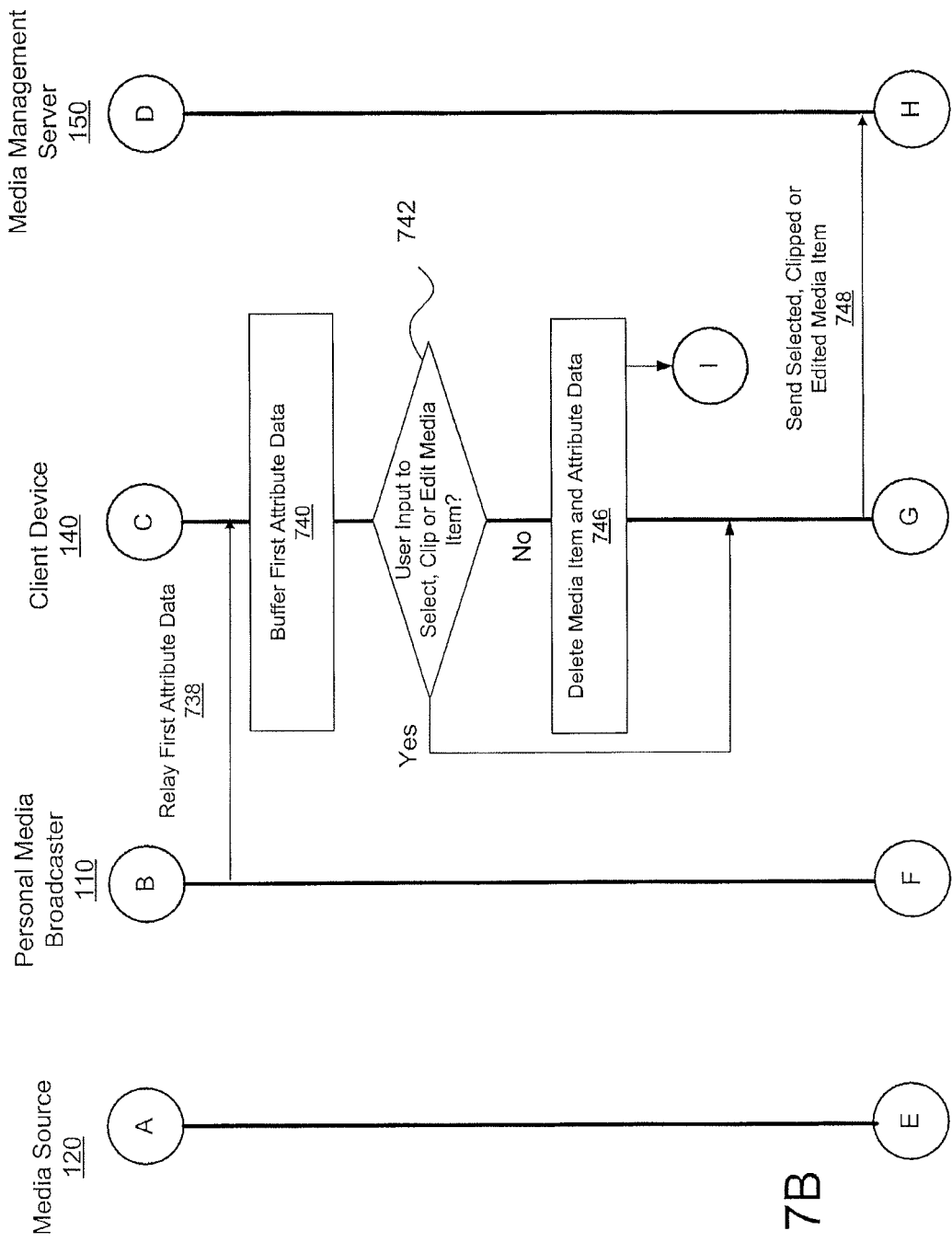

FIGS. 7A to 7C are flowcharts illustrating an exemplary method of determining the identity or attributes of the media item, according to one embodiment. According to FIG. 7A, the media source 120 first sends 704 the A/V signals to the personal media broadcaster 110. Then the personal media broadcaster 110 captures and processes 708 the A/V signal for transmission over the network 130. The processing of the A/V signal may include, among other operations, scaling of the images in the video sequence to a lower resolution, compressing, encoding, and/or packetizing of the video sequence for transmission over the network 130. By processing the A/V signal, a datastream of the media item is generated.

The datastream of the media item is then sent 714 to the client device 140. The datastream of the media item may be buffered 718 in the media buffer 650 for selecting, clipping, editing and/or any other features by the user.

In one embodiment, the personal media broadcaster 110 copies and separately processes 720 the banner image or a portion of the banner image. In another embodiment, the personal media broadcaster 110 may tag the banner image or a portion of the banner image for encoding in a higher resolution without copying and separately processing the banner image.

The processing 720 of the banner image may include learning the location and structure of the banner information. The personal media broadcaster 110 may select a portion of the banner image based on the learning of location and structure of the banner information. As described above with reference to FIG. 3, the banner image can be processed in high resolution and sent 722 to the client device 140 over the network 130. The higher resolution of the banner image allows the text data included in the image to be recognized more accurately by the VOCR server 160 or the client device 140. After the banner image is received, the client device 140 buffers 726 the image in the banner buffer 660, as described above in detail with reference to FIG. 6.

The media source 120 also sends 730 first attribute data to the personal media broadcaster 110. The first attribute data may include, among others, EPG data, closed caption data, XDS data and/or the like. The personal media broadcaster 110 captures 734 the first attribute data. The captured first attribute data 738 is then relayed to the client device 140. The first attribute data is buffered 740 in the client device 140.

If the user decides not to select, clip or edit 742 the buffered media item for storage, the datastream of media item and its attribute data can be deleted from the client device 140 as the media buffer 650 is updated with the datastream of a new media item and the banner buffer 660 is updated with the attribute data. Then the process returns to the step of sending the A/V signal from the media source 120 to the personal media broadcaster 110. In one embodiment, the buffer banner image and the first attribute data are processed as described above as soon as they are received by the client device 140 to determine the identity or attributes of the media item.

In contrast, if the user decides to select, clip or edit 742 the buffered media item for storage, the selected, clipped or edited media item is sent 748 from the client device 140 to the media management server 150 via the network 130. Alternatively, the selected, clipped or edited media item may be stored on the client device 140. Also, the banner image may be processed 750 to obtain second attribute data by the client device 140 or by the VOCR server 160.

The client device 140 then determines 754 the identity or attributes of the media item based on the first attribute data and the second attribute data. As described above in detail with reference to FIG. 6, the client device 140 may reference a database (e.g., the program database) to verify or determine the identity or other attributes of the media item. After determining the identity or attributes of the selected or edited media item, the identity or attributes of the media item are sent 758 to the media management server 150.

The identity or attributes of the media item are then stored 762 on the media management server 150. The media item stored on the media management server 150 is associated with the stored attributes to allow the media item to be searched using the attributes of the media item.

Alternatively, the identity or attributes of the media item can be stored on the client device 140 instead of being sent to the media management server 150. The user may search and retrieve the media item stored on the client device 140 based on the identity or attributes of the media item. The process then returns to the step of sending the A/V signals from the media source 120 to the personal media broadcaster 110, as desired.

In another embodiment, the attributes of the media item are first determined using the first attribute data. Subsequently, the attributes of the media item are updated and revised using the second attribute data derived from the banner image. That is, the client device 140 may preliminarily determine the identity or the attributes of the media item using the first attribute data, and can update, correct or revise the identity or the attributes according to the second attribute data if the preliminary identity or attributes is incorrect. This scheme of preliminarily determining the identity or the attributes is advantageous in some embodiments because the media item can be uploaded or stored promptly using the identity or attributes as index of the media item.

Extraction of Attribute Data from Banner Information

In one embodiment, the banner text generator 670 or the VOCR server 160 outputs the text data including characters recognized from the banner image. The text data without further processing may be merely a string of characters that does not by itself indicate the identity or attributes of the media item. Referring to FIG. 4, for example, the text data may read "Channel 8 CNN."

Unless the characters in such text are separated and filtered in a meaningful way (e.g., channel number on this set-top box is "8", and the name of the broadcaster is "CNN"), the client device 140 cannot typically determine the identity or attributes of the media item. Accordingly, filtering or post-processing of the text data can be applied to determine the identity or attributes of the media item from the text data. Further, the information extracted from the banner/VOCR process may be verified against program data obtained from any other available source (e.g, the program database) to further improve the reliability of such data.

In one embodiment, hardware or software components for filtering or post-processing the extracted text data from the banner image may be implemented in the banner text generator 670, the VOCR server 160, or other components of the personal broadcasting system 100.

The attributes of the media item that can be extracted from the text data may include, among other information, dates/times, the name of the channel broadcasting the media item, the channel number, and the title of the media item. In one embodiment, the banner text generator 670 or the VOCR server 160 outputs the locations of the characters within the image along with the extracted text data.

The locations of the characters may be used to take into account spatial correlations between the characters in determining the identity or attributes of the media item. For example, if two numbers appearing in the image (e.g., "1" and "5") are adjacent to each other, the two numbers may be merged into a single number (e.g., "15"). By merging or grouping certain characters using spatial correlations between the characters, meaningful attribute data can be generated from the raw text data.

In one embodiment, to obtain dates and/or times in the banner information, the text data can be scanned for strings of characters and numbers matching predefined date-time formats. Examples of the predefined date formats include, without limitation, the following: m/d/yyyy, m/dd/yyyy, mm/d/yyyy, mm/dd/yyyy, m-d-yyyy, m-dd-yyyy, mm-dd-yyyy, mm-dd-yyyy, m/d/yy, m/dd/yy, mm/d/yy, mm/dd/yy, m-d-yy, m-dd-yy, mm-dd-yy, m/dd, mm/dd, m/d, mm/d, m-dd, mm-dd, m-d, mm-d and/or the like (where 'm' refers to a single digit number indicating month, 'd' refers to a single digit number indicating date, and 'y' refers to a single digit number indicating year). Likewise, examples of the predefined time formats could include, without limitation: h, h/nn, h, h/nn/(a or p), h/nn-h/lnn, hh/nn, and h/nn/(am or pm) (where 'h' refers to a single digit number indicating hour, 'n' refers to a single digit number indicating minute, 'a' refers to ante meridiem, 'p' refers to post meridiem). A string of alphanumeric characters matching such formats are classified as candidates for characters indicating dates or times.

To obtain channel names, the following exemplary rules may be used: (1) the length of the channel name is restricted (e.g., not less than two characters and not more than eight characters), (2) the first and last character are alphanumeric characters, (3) the channel name should not coincide with date-time format (as described above in detail), and (4) the channel should not include certain characters or certain strings of characters.

To obtain channel numbers, the numbers not matching the date-time formats are selected as candidates for channel numbers. Further, numbers closely located to the channel names are considered likely candidates for the channel numbers.

To obtain the candidate text for the title of the media item, the spatial correlation between candidate characters for the title of the media item and candidate characters for the channel name and/or the channel number may be considered. In one embodiment, the area of the image (e.g., text box) including the channel name or the channel number becomes a reference area for searching the title of the media item. Predefined areas in proximity to the reference area are searched for the title of the media item. The predefined area is, for example, an area above or below the area for the channel name or number having double the height of the text box for the channel name or number. If no candidate for the title of the media item is found within the predefined area, then the search can be expanded to other areas of the image for any alphanumeric characters that are likely to be the title of the media item. A filter may also be used to exclude alphanumeric characters that are unlikely to be the title of the media item.

In one embodiment, the algorithms and filters may be updated after deployment of the component including hardware or software components for filtering and post-processing of the text data. For example, the filters for excluding certain strings of characters from being classified as the title of the media item may be revised and updated dynamically to more accurately determine the attributes of the media item.

In one embodiment, the accuracy of extracted attributes may be improved gradually over time using a learning algorithm to learn the structure of banner information. Specifically, learning algorithm accumulates information on which area of the image generally includes information for certain attributes. During the learning process, the attribute data from other sources (e.g., XDS data) can be used to learn and confirm which areas of the image include which information. The banner processor module 256 suitably learns the layout of the banner information 320 based on consistent matching of the text in certain locations of the banner image and the attributes determined from other types of the attribute data. For example, the banner processor module 256 may track the location of the banner information 320 that consistently matches the channel names in the EPG data, and then learn that the channel names are displayed at such location. In one embodiment, the confidence score may be considered in determining whether the channel names match with the text extracted from certain locations of the banner image. By automatically learning the structure of the banner information, the attributes can be extracted accurately and efficiently without a priori knowledge of the banner information structure.

In one embodiment, the information of the learned layout of the banner information 320 is stored in a learning table where each entry within the table contains location information (e.g., x-coordinate, y-coordinate, width and height), success rate, and entry last updated time (ELUT).

In such embodiments, the text extracted from the banner information 320 can be first searched for results matching the attributes of the media item. The text is determined as coinciding with certain attributes of the media item when the confidence score for the attribute exceeds a certain threshold. In each learning cycle, the text from some or all of the regions of the banner image can be processed. For each discrete region of the banner image including the text, an entry is created in the learning table to keep track of the success count for matching of the text with attributes of the media item.

Specifically, if the text from one region of the banner image matches a certain attribute (as determined from the confidence score derived from matching with attributes from other sources), the success count can be incremented by one (or any other appropriate value). As described above, the text from the banner information 320 can be determined as matching the attribute when the confidence score for that attribute exceeds a threshold.

After the region provides successful count for over a predetermined number (e.g., three (3)) of banner images, the entry in the table is considered and flagged as having been learned successfully. Alternatively, if a different region in the next banner image matches the attributes, the different region is newly added to the entry (if not previously added), and the success count for the attribute is increased (e.g., by one or another suitable value) for the newly added entry. For each banner image, the matching regions are identified, and the success count for each region is increased for matching attributes. By repeating the process over a number of banner images, the learning table accumulates information on which regions of the banner image includes the text on which attributes of the media item.

Further, in various embodiments, aging may be introduced in the learning mechanism to update or relearn the banner information structure when the learning becomes outdated or invalid. For example, if a confidence score associated with the attributes determined from the banner information drops and persists for a certain amount of time, previous learning can be discarded and a new learning process started. Specifically, the entries in the learning table may be monitored to track for increase in the success count. If the success count for an entry is not increased for a certain amount of time (e.g., seven (7) days or so) or for a certain number of banner images, the entry may have been incorrectly learned or the entry may be outdated. After the success count for the entry is not increased for a certain amount of time or for a certain number of banner images, the entry may be removed from the learning table or the success count for that entry may be decreased for each upcoming banner image. After the success count reaches zero or another predetermined value, the entry can be removed from the learning table.

In one embodiment, vertically (or otherwise) shifted locations of the region as indicated by the entry are searched before removing the entry from the learning table. Some service providers shift the regions for displaying certain attributes of the media item vertically up or down in each banner image. Therefore, to avoid removing entries for such cases, the attributes can be searched in the vertically shifted regions before removing the entry from the learning table. The entries may also be flagged to indicate that coinciding text is found at vertically shifted locations so that vertically shifted locations are searched in the subsequent banner images.

Exemplary Detection of Media Item Transition

Figure 8:
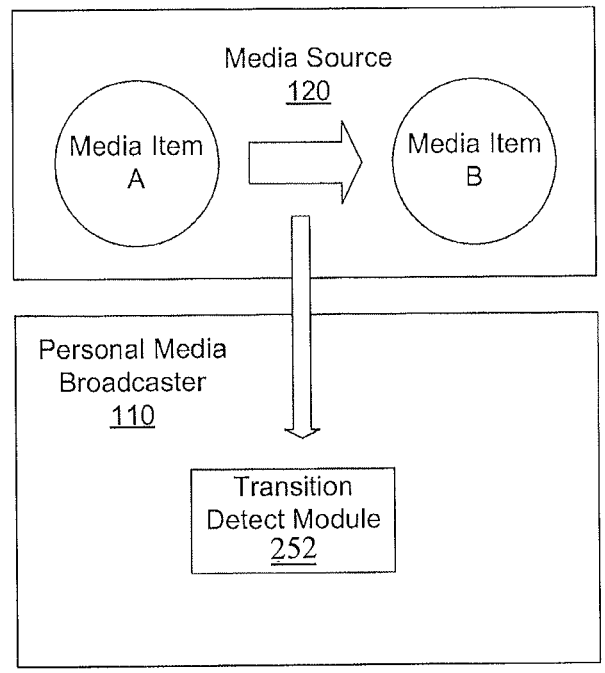
FIG. 8 is a block diagram illustrating transition of media items.
Figure 9:
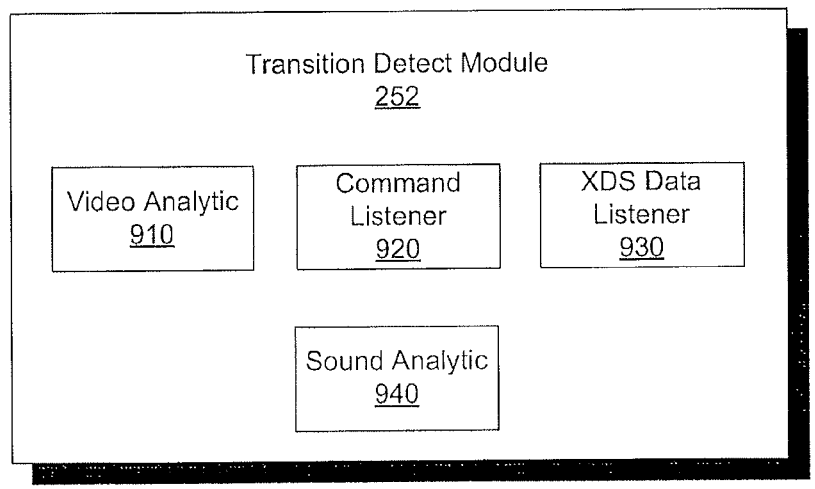
FIG. 9 is a block diagram of an exemplary transition detect module.

FIG. 8 is a diagram illustrating an exemplary transition of the media items provided by the media source 120 to the personal media broadcaster 110. The A/V signals provided by the media source 120 may include data for media item A at a certain time. At a subsequent time, the A/V signals sent by the media source 120 may include data for media item B. Detecting the transition of the media item from the media source 120 can be important because the identity or attributes are typically updated as the A/V signals include a new media item. If the new media items are indexed in the media management server 150 or the client device 140 with stale identity or attributes from the previous media item, the media management server 150 may not provide accurate search result or may restrict distribution of protected media items.

The transition of the media item can occur for various reasons including, among other reasons, scheduled termination of a media item followed by another media item, user inputs (via either the client device 140 or the media source 120) commanding the media source 120 to change channels or sources of input, and commands from a service provider prompting changes in the media item.

The transition detect module 252 of the personal media broadcaster 110 may therefore use one or more methods to detect the transition of the media item. As shown in FIG. 9, an exemplary transition detect module 252 may include, for example, a video analytic module 910, a command listener module 920, an XDS data listener module 930, and a sound analytic module 940. After detecting the transition of the media item using any of these modules, the transition detect module 252 may request the personal media processor 120 to provide updated attribute data.

The video analytic module 910 detects changes in the images received from the media source 120 indicative of the transition in the media item. In one embodiment, the video analytic module 910 detects black screens, frozen screens, and transition from a menu screen (e.g., an electronic program guide (EPG) screen) to a non-menu screen and/or the like. In many media sources, the black screens or the frozen screens can appear before transitioning to a different channel. Also, the menu screens are often used by the user to find and switch to a channel that the user wants to view. Therefore, the black screens, the frozen screens, and transition to or from the menu screen serves as cues for the transition in the media item.

In one embodiment, the black screens can be detected by calculating the average luminance value of all the macroblocks in an image. For example, the image can be determined as a black screen if a certain number of macroblocks within the image are predominantly filled with black (or dark) pixels.

In one embodiment, one macroblock may be a 16×16 or 8×8 or any such array of pixels in the image.

In one embodiment, frozen screens can be detected by calculating the absolute sum of motion vectors in the macroblocks in consecutive images of a video sequence. If the absolute sum of the motion vectors in the consecutive images is below a threshold value, the screen may be appropriately determined to be a frozen screen.

In one embodiment, the transition to or from a menu screen is detected using changes in the color components in the images. One method of detecting the transition is to use U and V component of the YUV color data of pixels in the images. First, U values for some or all of the pixels may be obtained to generate a normalized histogram as illustrated in FIG. 10A. Then local maximum U values across a certain number of pixels (e.g., four pixels) can be obtained as illustrated in FIG. 10B.

From the local maximum U values, a predetermined number (e.g., four in the example of FIG. 10C) of highest U values are selected as illustrated in FIG. 10C. The rest of the local maximum U values can be discarded from further analysis, as appropriate. The selected local maximum U values are then considered to be signature U values for that image. Signature V values are obtained in the same manner as the signature U values except that V values of the pixels are used instead of the U values. After obtaining the signature U and V values, these signature values from a previous (or next) image are compared with a current image. If the differences in the signature U and V values between the current and the previous (or next) image exceed a threshold, it may be determined that the transition to or from a menu screen has occurred.

In one embodiment, the transition to or from a menu screen is detected using the presence or the amount of text present in the images. If the number of characters appearing in the image is below a threshold or if the image does not have any characters, the image can be determined to be a non-menu screen. In contrast, if the number of characters in the image is above the threshold, the screen can be determined as a menu screen. In order to reduce the computation required to detect the menu screen using the number of characters, a coarse determination of text lines may be used instead of extracting the text data using the computation-intensive optical character recognition algorithm. One example of coarsely determining the text lines is to determine areas occupied by text lines characterized by portions of image having high contrast horizontal edges.

In one embodiment, the transition to or from a menu screen is detected using motion vectors in the images. If the motions in the consecutive images are low, then the image is determined as a candidate for a menu screen. The frozen images also generally have low motions, and thus, the transition detect module 252 may include codes and algorithm to distinguish the frozen images and the menu screen.

With reference again to FIG. 9, the command listener 920 suitably detects commands from the client device 140 for operating the media source 120 via the personal media broadcaster 110. The media source 120 may be controlled remotely by the client device 140 via the controller interface 235 of the personal media broadcaster 110. The command listener 920 detects commands from the client device 140. The commands from the client device 140 may include, among others, a channel change command, a volume change command, a device configuration command, and/or the like. Some commands may be context sensitive and cause transition of the media item under some circumstances but not in others. It may therefore be difficult to distinguish between commands that cause transition in the media item and commands that do not cause transition in the media item. Accordingly, in some embodiments, some or all of the commands received from the client device 140 to operate the media source 120 can be treated as cues for changing the media item at the media source 120. After the commands are detected at the command listener 920, the video analytic module 910 can be activated to detect the transition between the media item A and the media item B. Following the activation of the video analytic module 910, the banner processor module 256 and the attribute extractor 264 are notified of the suspected transition so that these modules may extract the new attribute data associate with the new media item.

The XDS data listener 930 suitably detects changes in the XDS data received from the media source 930. The XDS data includes, among other data, the title of the media item, the name of the broadcaster, the category of the media item, the episode number of the series, the rating of the media item, and the program synopsis. The changes in the XDS data are often caused by changes in the media item. Therefore, the changes in the XDS data may be monitored to detect the transition of the media item.

The sound analytic module 940 suitably detects whether the audio from the media source 120 is silent. In some media sources 120, changes in the channel are accompanied by silence in the audio. In one embodiment, the sound analytic module 940 is used in conjunction with the video analytic module 910 to determine the transition in the media item.

The above modules of the transition detect module 252 are merely illustrative. Other methods and cues may also be used by the transition detect module 252 to determine the transition of the media item received from the media source 120. In one embodiment, more than one of the modules in the transition detect module 252 are cooperatively employed to improve the accuracy of the media item transition.

Capturing of Banner

FIG. 11A is a diagram illustrating an exemplary scheme for capturing and buffering of the banner image in the personal media broadcaster 110, according to various embodiments. After detecting transition of the media item at the transition detect module 252, the banner processor module 256 of the personal media broadcaster 110 suitably captures the banner image from the media source 120. In one embodiment, the banner image is captured after a certain amount of time elapses from the time the transition is detected. This is because in some media sources, the banner information is automatically displayed shortly after the channel changes. Therefore, the banner image can be captured shortly after an event indicative of the transition is detected. The amount of elapsed time for capturing the banner image may be set differently depending on the type of the media source 120.

In other media sources, the banner information is not automatically displayed on the screen after the channel changes. For such media sources, the personal media broadcaster 110 may force the media source 120 to display the banner information by transmitting a command requesting the banner image to the media source 120 via the controller interface 235.

The transition detect module 252, however, may not detect all of the transitions in the media items. For example, the transition detect module 252 may not detect the transition of the media item when a media item terminates after the scheduled time and no XDS data is available from the channel broadcasting the media item. Therefore, the personal media broadcaster 110 can periodically send commands to the media source 120 to have the media source 120 provide the banner image, and can also capture other attribute data (e.g., XDS data) included in the A/V signal from the media source 120. The personal broadcasting device 110 then captures the banner image as appropriate. In one embodiment, the personal broadcasting device 110 sends another command removing the banner information from the screen after capturing the image to reduce the time during which the banner information appears on the screen. By reducing the time during which the banner information is displayed, the user may experience less inconvenience associated with banner information appearing on the screen.

In one embodiment, the client device 140 sends the commands to force the banner image consistent with the broadcasting schedule of the media items. For example, it is common for media items to start and end at regular time intervals, such as every thirty minutes or every hour. The client device 140 may therefore keep track of the local time at the location where the personal media broadcaster 110 is located, and may send out the commands to the media source 120 to force the banners at or around the half hour or one hour boundaries. By capturing the banner images in accordance with the broadcasting schedule, the likelihood of obtaining the updated attribute data is increased.

In various embodiments, the banner image can be tagged with a time stamp indicating the time at which the image is captured. Using the tagged information, the client device 140 may determine the attributes of the media item using the banner image by identifying and processing the one or more banner images having the time stamp during which the media item was provided by the media source 120.

FIG. 11A illustrates capturing of the banner images, according to one embodiment. After the media source 120 is turned on, the media source 120 starts playing the media item A. After the media item A starts playing, the banner information appears on the image during time t1. The banner information may appear automatically on the image or in response to commands from the personal media broadcaster 110 requesting the display of the banner image. During the time t1, the personal media broadcaster 110 captures the banner image B1 and buffers the banner image B1 in the banner buffer 660. Specifically, the banner processor module 256 of the personal media broadcaster 110 captures the banner image B1, processes the banner image B1, and then sends the processed banner image B1 to the client device 140 over the network 130 for temporarily storing in the banner buffer 660.

In the example of FIG. 11A, the user changes the channel of the media source 120 either by operating a remote control unit of the media source 120 or by sending commands via the client device 140 and the personal media broadcaster 110. In response, a sequence of black screens or frozen screens is generated by the media source 120 (illustrated as a thick black line between the media item A and the media item B in FIG. 11A). The personal media broadcaster 110 detects the transition in the media item by listening to the commands from the client device 140 and by detecting changes in the video screen, as described above in detail with reference to FIG. 9.

After the transition to the media item B, the media source 120 provides the banner image B3 during time t3. During time t3, the banner image B3 is captured and sent to the client device 140 along with other attribute data.

In the example of FIG. 11A, the banner images and other attribute data are also captured periodically by the personal media broadcaster 110. After the banner image B1 is captured at the time t1, a subsequent banner image B2 is captured at the time t2 (after elapse of time from the time t1) even though transition in the media item is not detected. Likewise, at time t4, t5, t6, t7, and t8, the banner images B4, B5, B6, B7, and B8 are generated by the media source 120, and captured, processed, and sent to the client device 140 via the network 130. At these times, other attribute data are also captured and sent to the client device 140.

Periodically obtaining the banner images B4, B5, B6, B7, and B8 serves as a safeguard against transition to a new media item without any events detectable by the transition detect module 252. In the example of FIG. 11B, the media item B transitions to the media item C without any event indicative of the transition. Because the banner image is captured by the personal media broadcaster 110 periodically, however, the banner images B6-B8 at times t6-t7 may be available to determine the attributes of the media item C.

In one embodiment, the period for capturing the banner image is adjusted dynamically. In another embodiment, the period for forcing and capturing the banner image is fixed (e.g., every ten minutes).

In one embodiment, other attribute data is relayed to the client device 140 regardless of the detection of the transition in the media item. The attribute data may be monitored by the client device 140 to determine the transition of the media item.

Exemplary Determining Attributes after Clipping of Media Item

In various embodiments, the attributes of the media item are determined only after the user selects, clips or edits the media item, as described above in detail with reference to FIGS. 7A to 7C. In the example of FIG. 11B, the user selects, clips or edits a portion 1110 of the media item C. In one embodiment, after the media item C is selected, clipped or edited, the banner image B6 having the time stamp closest to the starting point of the clipped portion 1110 but subsequent in time is used for obtaining the attribute data of the media item C.

In another embodiment, two or more banner images (e.g., B6, B7, and B8) having time stamps after the starting point of the clipped portion 1110 are used to obtain the attribute data of the media item C. Attribute data from other sources (e.g., XDS data) captured after starting point of the clipped portion 1110 can also be provided to the client device 140 to determine the attributes of the media item C.

In one embodiment, the user is not allowed to clip across different media items. If edited media item includes more than one media items, it can become difficult to accurately classify the edited media item at the client device 140 or the media management server 150. The client device 140 therefore compares the attributes of the media item at the starting point of the clipped portion 1110 and the end point of the clipped portion. If the attributes at the start point and the end point are different, the end point of the clip may be rejected and the user is requested to select another end point closer to the starting point.

Exemplary Out-of-band (OOB) Transmission of Banner Image

In one or more embodiments where the high resolution banner images are transmitted over the network 130, the condition and bandwidth of the network 130 may be detected to decide whether the banner images should be transmitted in the same channel as the datastream for the media item. If the bandwidth of the network 130 is sufficient to transmit sufficiently high resolution and high quality images of the media item, then the personal media broadcaster 110 identifies the banner images by tagging. In this way, the banner image is transmitted to the client device 140 "in-band", i.e., in the same datastream as the media item.

In contrast, if the bandwidth of the network 130 is insufficient to transmit sufficiently high resolution and high quality images of the media item, then the banner image is captured in the personal media broadcaster 110 and processed separately from the main datastream of the media item and transmitted as an additional datastream to the client device 140. In this case, the banner image is transmitted "out-of-band" to the client device 140. Such out-of-band transmission of the banner image insures that the banner images received at the client device 140 are of sufficient resolution and quality for text data extraction while not interfering with the transmission of the media item datastream. In one embodiment, the resolution of 640×480 pixels is considered sufficiently high resolution and quality.

During the out-of-band transmission of the banner image, priority is given to the datastream of the media item. In one example, no more than 10% or so of the total capacity of the network 130 is allocated to the banner image. In such case, the banner image may be trickled to the client device 140 over a period of time. In other words, the datastream of the media item is sent over the network in a main channel with minimum latency in order to allow real time access to the media item at the client device 140. In contrast, the banner images are sent to the client device 140 in an out-of-band (OOB) channel separate from the main channel having greater tolerance for latency.

The banner images need not be sent to the media device 140 in real-time because the time at which the banner image is received at the client device 140 is not necessarily time-sensitive. In the embodiments where the identity or attributes of the media item is determined after the user selects, clips or edits the media item, the banner images become necessary only after the user selects, clips or edits the media item to determine the identity or attributes of the media item.

Therefore, the banner images need only be received by the time the client device 140 decides to select, clip or edit the media item. Even if the banner images are not received by this time, the identity or attributes of the media item may be determined from other sources and later corrected after the banner images are received and processed.

In one embodiment, the banner images are transmitted to the client device 140 using the bandwidth of the network available after transmitting the datastream of the media item. The banner images can be packetized into multiple packets. The number of packets for the banner images is restricted so that the packets for the datastream of the media item are delivered to the client device 140 without significant latency. The network condition detector 260 may detect the condition of the network and control the transmission rate for the packets of the banner images accordingly.

FIG. 12 is a diagram illustrating the process of transmitting the banner image in the OOB channel, according to one embodiment. In this example, the video signal processor module 272 of the personal media broadcaster 120 includes, among other components, a scaler 1210 and a first encoder 1220. The banner processor module 256 of the personal media broadcaster 120 includes, among other components, an interleaver 1240, and a second encoder 1250. In this example, the media source 120 provides interlaced video images including data for field (n) 1202 and field (n+1) 1204. Field (n) 1202 includes odd lines of a video frame, and field (n+1) 1204 includes even lines of the video frame.

Both fields 1202, 1205 can be fed to the scaler 1210 and converted to a frame 1214 scaled to have resolution lower than the original frame consisting of fields 1202, 1205. The converted frame 1214 is then fed to the first encoder 1220 to generate a datastream 1224. The datastream 1224 is then fed to the multiplexer 1230 as appropriate.

In one embodiment, the fields 1202, 1204 are also fed to the interleaver 1240 of the banner processor module 256. The interleaver 1240 determines the portion of the banner image including the banner information (shown as hashed boxes in the fields 1202 and 1204). The interleaver 1240 extracts the portion of the fields 1202, 1204 including the banner information, interleaves lines from both fields 1202, 1204, and generates a banner image 1254 in high resolution. The banner image 1244 is then fed to the second encoder 1250 which converts the banner image 1244 into packets 1254. In one embodiment, the banner image 1244 is not scaled down to a lower resolution in the banner processor module 256.

The second encoder 1250 receives commands from the network condition detector 260 so that the amount of the banner image packets 1254 from the second encoder 1250 does not delay the transmission of the media item datastream packets 1224. To determine the bandwidths available to transmit the packets for the banner image, the network condition detector 260 receives information from the first encoder 1220 the amount of data the first encoder 1220 will be sent over the network 130. The packets of the datastream 1224 and the packets of the banner image 1254 are both fed into a multiplexer 1230. The multiplexer 1230 combines the datastream packets 1224 and the banner image packets 1254 for transmission over a communication line 1234 to the network 130. As illustrated in FIG. 12, the packets of the datastream 1224 and the packets of the banner image 1254 are transmitted in two separate channels.

In one embodiment, the attribute data (e.g., XDS data) from other sources is included in either the packets for the datastream of the media item 1224 or the packets for the banner image 1254. Alternatively, the attribute from other sources may be transmitted to the client device 140 in a channel separate from the main channel for the datastream packets 1224 and the OOB channel for the banner image packets 1254.

Alternative Embodiments

Different combinations of functionality and modules may be included in the components of the personal broadcasting system 100. For example, components of the personal media broadcaster 110 such as the transition detect module 252 may be implemented on the client device 140. In this example, the client device 140 may send a command to the personal media broadcaster 110 to force and capture the banner image via the network upon detecting the transition of the media item.

Also, the entirety of a function implemented by a component of the personal broadcasting system 100 may be incorporated into other components of the personal broadcasting system 100. For example, the VOCR server 160 may be incorporated into the client device 140 or the media management server 150.

In one embodiment, the media management server 150 further includes a server for verifying whether distribution of the media item is restricted for any reason (e.g., copyright protection) using the identity or attributes of the media item as determined by the client device 140. If the distribution of the media item is illegal or otherwise not permitted, the media management server 150 may decline to store the media item.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the art to convey the substance of their work effectively to others skilled in the art. These operations, while described functionally, computationally, or logically, may be understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described. Such a computer program may be stored in a tangible computer readable storage medium or any type of media suitable for storing electronic instructions. Embodiments of the invention may also relate to an apparatus for performing the operations described herein.

This apparatus may be specially constructed for the various purposes, and/or it may comprise a general-purpose computing device selectively activated or reconfigured by a computer program stored in the computer.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

What is claimed is:

1. A computer-implemented method for determining attributes identifying different television programs provided in a media stream, the method comprising:
   receiving a first video sequence representing a first television program from a media source;
   receiving a second video sequence representing a second television program that is different from the first television program subsequent to receiving the first video sequence;
   detecting a transition from the first video sequence to the second video sequence within the media stream;
   in response to detecting the transition, extracting identifying information from the second video sequence; and
   identifying the second television program received in the second video sequence based on the identifying information extracted from the second video sequence;
   wherein the identifying comprises determining the attributes of the second television program by:
      generating first candidate attributes based on the identifying information extracted from a banner image contained in one or more images of the second video sequence;

generating second candidate attributes based on information other than the identifying information extracted from the banner image; and determining the attributes of the second television program based on the first candidate attributes and the second candidates attributes.

2. The method of claim 1, wherein the extracting comprises:

capturing one or more images of the second video sequence having banner images embedded therein; and generating text data representing the identifying information that is visually presented in the captured one or more images by using automatic character recognition.

3. The method of claim 2, wherein the extracting further comprises filtering the text data to extract the identifying information.

4. The method of claim 1, wherein determining the attributes of the second television program further comprises generating a confidence score based on matching of the first candidate attributes with the second candidate attributes, the confidence score representing likelihood that the determined attributes of the first television program are accurate.

5. The method of claim 1, wherein the information other than the identifying information includes data for an electronic program guide, closed caption data, and XDS (extended Data Services) data.

6. The method of claim 1, further comprising learning a structure of the identifying information and a location of a banner image within one or more images of the received second video sequence.

7. The method of claim 1 wherein the identifying information is obtained from an electronic programming guide.

8. The method of claim 1 wherein the extracting comprises sending at least a portion of the second video sequence via a network to a media management server and receiving the identifying information from the media management server.

9. A computer-implemented method for determining attributes identifying different television programs provided in a media stream, the method comprising:

receiving a first video sequence representing a first television program from a media source;

receiving a second video sequence representing a second television program that is different from the first television program subsequent to receiving the first video sequence;

detecting a transition from the first video sequence to the second video sequence within the media stream;

in response to detecting the transition, extracting identifying information from the second video sequence; and identifying the second television program received in the second video sequence based on the identifying information extracted from the second video sequence, wherein detecting the transition from the first video sequence to the second video sequence comprises detecting a user command associated with a channel change in the media source, detecting changes in XDS (extended Data Services) data received from the media source, detecting changes in an image received from the media source, or comparing first text data extracted from first banner information contained in the first video sequence with second text data extracted from second banner information contained within the second video sequence.

10. An apparatus for sending a datastream representing a sequence of media programs to a client device via a network, comprising:

an input interface configured to receive the media programs;

processing circuitry coupled to the input interface and configured to construct the datastream in a format suitable for transmission over the network that includes the at least one of the media programs, the datastream including images in a first resolution, wherein the processing circuitry is further configured to extract first attribute data representing data for identifying the media program from other media items, and to detect a transition in the media item received from the media source wherein the transition is detected by detecting a user command associated with a channel change in the media source, detecting changes in XDS (extended Data Services) data received from the media source, detecting changes in an image received from the media source, or comparing first text data extracted from first banner information contained in the first video sequence with second text data extracted from second banner information contained within the second video sequence; and a network interface configured to transmit the media stream and the first attribute data of the media item to the client device over the network.

11. The apparatus of claim 10, wherein the first attribute data comprises at least one of data from an electronic program guide, closed caption data, and XDS (extended Data Services) data.

12. The apparatus of claim 10, wherein the attribute data is transmitted over the network in a first channel having lower priority than a second channel via which the datastream is transmitted.

13. A method of selecting and storing media items received from a personal media broadcaster via a network, comprising:

receiving a first video sequence of a first media item from the personal media broadcaster;

receiving a second video sequence of a second media item subsequent to the first video sequence of the first media item;

receiving first attribute data associated with the second media item from the personal media broadcaster, the first attribute data representing data for identifying the second media item from other media items;

receiving second attribute data associated with the second media item from the personal media broadcaster, the second attribute data representing data for identifying the second media item that is disparate from the first attribute data and identifying the second media item using the first and second attribute data responsive to detecting a transition from the first video sequence to the second video sequence.

14. The method of claim 13, further comprising sending the attributes of the first media item and a portion of the data stream selected by the user to a media management server via the network for sharing with other users.

15. The method of claim 13, wherein the first attribute data comprises banner information embedded in an image in the first video sequence.

16. The method of claim 15, further comprising receiving via the network text data generated from the banner information using a character recognition server responsive to sending a portion of the image including the banner to the character recognition server via the network.

17. The method of claim 16, wherein the first attribute data is received via a first channel, and the first video sequence is received via a second channel having a higher priority than the first channel.

18. The method of claim 13, wherein the second attribute data comprises data for an electronic program guide, closed caption data, and XDS (extended Data Services) data.

* * * * *